(12) United States Patent
Noah

(10) Patent No.: US 6,556,143 B2
(45) Date of Patent: Apr. 29, 2003

(54) BROKEN SHEAR PIN INDICATING SYSTEM

(75) Inventor: Greg Noah, Denver, CO (US)

(73) Assignee: S&S Trust, Commerce City, CO (US)

( * ) Notice: Subject to any disclaimer, the term of this patent is extended or adjusted under 35 U.S.C. 154(b) by 161 days.

(21) Appl. No.: 09/871,273

(22) Filed: May 31, 2001

(65) Prior Publication Data

US 2001/0048369 A1 Dec. 6, 2001

Related U.S. Application Data

(60) Provisional application No. 60/208,353, filed on May 31, 2000.

(51) Int. Cl.[7] .............................................. G08B 21/00
(52) U.S. Cl. ................. 340/679; 340/686.3; 340/686.6; 37/257
(58) Field of Search ................................. 340/679, 680, 340/686.1, 686.3, 686.6, 309.15, 438; 37/257, 258, 219, 220, 223, 224, 250

(56) References Cited

U.S. PATENT DOCUMENTS 4,477,988 A * 10/1984 Vohl ............................ 37/250

FOREIGN PATENT DOCUMENTS

| JP | 357191472 A | * 11/1982 | .................. 415/118 |
| JP | 402183993 A | * 7/1990 | .................. 37/257 |
| JP | 403245946 A | * 11/1991 | .................. 29/404 |

* cited by examiner

Primary Examiner—Van Trieu
(74) Attorney, Agent, or Firm—Alan R. Thiele

(57) ABSTRACT

The invention relates to a system and method for indicating a broken shear pin on a snow blower head cutter drum in a rotary snow blower. At least one shear pin connects the snow blower head cutter drum to a drive shaft on the snow blower. The indicator system utilizes a proximity sensor which is mounted on the drive box of the vehicle and focused on at least one target on the snow blower head cutter drum. As the snow blower head cutter drum rotates, the proximity sensor detects the passage of the target and resets a timer. When the shear pin breaks, the cutter drum stops rotating. Because the proximity sensor does not detect the target, the timer is not reset. When the elapsed time equals or exceeds a predetermined amount, an electrical impulse is transmitted, activating the broken shear pin indicator.

17 Claims, 2 Drawing Sheets

BROKEN SHEAR PIN INDICATING SYSTEM

This application claims the benefit under Title 35 United States Code §119(e) of U.S. Provisional Application No. 60/208,353, filed May 31, 2000.

BACKGROUND OF THE INVENTION

1. Technical Field

The present invention pertains to broken shear pin indicating systems for rotary snow blowers. More particularly, the present invention pertains to a broken shear pin indicating system which utilizes a proximity sensor to detect cessation of operation of the snow blower head cutter drum.

2. History of Related Art

Large rotary snow blowers are used to clear roads of heavy snow buildup. As a rotary snow blower travels down a road, the cutter drums in the front of the machine move the snow off the road and the snow blower blows it over to the side of the road. If something is buried within the snow, such as a guardrail, boulder, or stationary object, the rotary blower head cutter drums will be stopped from turning. When this occurs, an extraordinary load is placed on both the transmission and on the entire power train. Such loads on the power train could destroy extremely expensive power train equipment and disable the snow blower for extended periods of time.

In the snow blowers in the prior art, shear pins are located in the power train in order to protect it. The shear pins are used to transmit power from the rotating inner shaft to the snow blower head cutter drums. If an object is contacted by the snow blower head cutter drums, the shear pins simply break and the expensive drive train components are thereby protected.

The problem which faces most operators of front discharge rotary snow blowers is that little indication is provided to the operator when a shear pin breaks. Some experienced operators may actually sense a small jerk or a noise which indicates that a shear pin has broken. But if one of the rotating snow blower head cutter drums is still working, most operators will assume that the blower is operating properly because a steady stream of snow will continue to be blown from the snow discharge outlet.

Prior art systems which attempted to provide an indication to the operator that a shear pin had, in fact, broken, have utilized a mechanical flag or mechanical clanker system.

In the mechanical flag system, the continuous rotation of the snow blower head cutter drum holds a flag in a noticeable position such that once the snow blower head cutter drum ceased rotating, the flag would no longer be visible. Another system utilizes a mechanical clanker to provide an audible indication to the operator that the snow blower head cutter drum was rotating. When the clanking ceases, the operator is alerted that shear pins have broken and a snow blower head cutter drum has stopped rotating.

While the prior art systems were effective when working properly, their lack of operational sophistication often provided unreliable results. There is therefore a need in the art for a simple, reliable system which quickly provides an obvious indication that a shear pin in the drive system for the snow blower head cutter drums in a snow blower has, in fact, broken.

SUMMARY OF THE INVENTION

The present invention is a system and method for indicating that a shear pin has broken in a snow blower head cutter drum in a rotary snow blower. A drive box (angle gearbox) is located between the two snow blower head cutter drums on the front of the snow blower. This drive box provides rotational power to the two snow blower head cutter drums mounted on either side. Located adjacent to the drive box are two proximity sensors. The proximity sensors are used to detect the speed of the cutter drums. One is located on each side of the drive box between the drive box and the cutter drum under a removable protective cover.

The proximity sensors monitor the speed of each cutter drum by detecting the presence of and time between designated targets. The proximity sensors are set to focus on a designated target.

Each time a designated target passes the stationary proximity sensor, a timer is reset. When the shear pins are broken, the timer will start measuring time and then continue measuring time as long as it is not reset. This measured time is then compared to a predetermined time. If the measured time equals or exceeds the predetermined time, then an indication is provided that the snow blower head cutter drum has stopped rotating due to the fracture of a shear pin and a signal is sent to the operator in the cab of the snow blower. This proximity sensor system provides a simple, reliable method to quickly provide an obvious indication to the cab operator that a shear pin has broken.

BRIEF DESCRIPTION OF THE DRAWING FIGURES

A more complete understanding of the structure and operation of the present invention may be had by reference to the following detailed description when read in conjunction with the accompanying drawings, wherein.

DETAILED DESCRIPTION OF THE PRESENTLY PREFERRED EXEMPLARY EMBODIMENT

Figure 1:
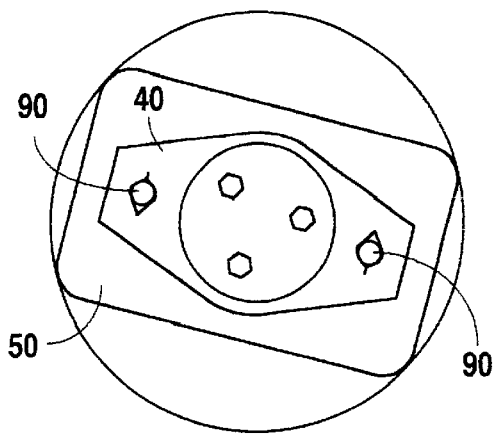
FIG. 1 is an end view of a blower head cutter drum with shear pins in the prior art.
Figure 2A:
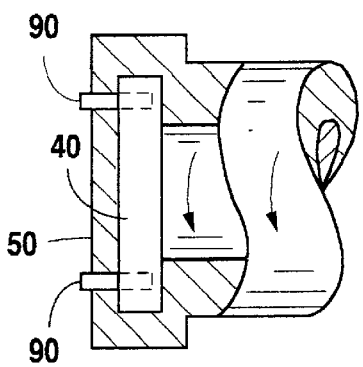
FIG. 2a is a cross-sectional view of the drive shaft and cutter drum with intact shear pins in the prior art.
Figure 2B:
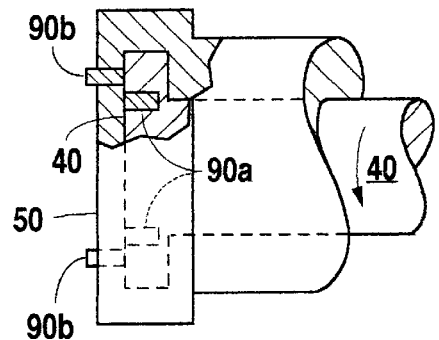
FIG. 2b is a cross-sectional view of the drive shaft and cutter drum with broken shear pins in the prior art.

A still better understanding of the system and method for a broken shear pin indicating system for a snow blower head cutter drum of the present invention may be had by reference to the drawing figures. FIG. 1 illustrates an end view of a blower head cutter drum 50 with shear pins 90 in the prior art. FIG. 1 shows the drive shaft 40 and the cutter drum 50 with the two shear pins 90. This assembly is located at the end of the snow blower head cutter drum 50. The use of shear pins 90 to provide a weak link in a drive train is well known in the prior art. As illustrated in FIG. 2a, the drive shaft 40 and the snow blower head cutter drum 50 are connected by at least one shear pin 90. As long as the shear pins 90 are not broken, the drive shaft 40, cutter drum 50, and shear pins 90 rotate in unison. However, as shown in FIG. 2b, when the snow blower head cutter drums 50 contact a resistant object in the snow, each shear pin 90 breaks into two pieces 90a and 90b. The expensive drive train components are protected thereby, since the drive train 40 continues rotating freely while the cutter drum 50 is stopped.

Figure 3:
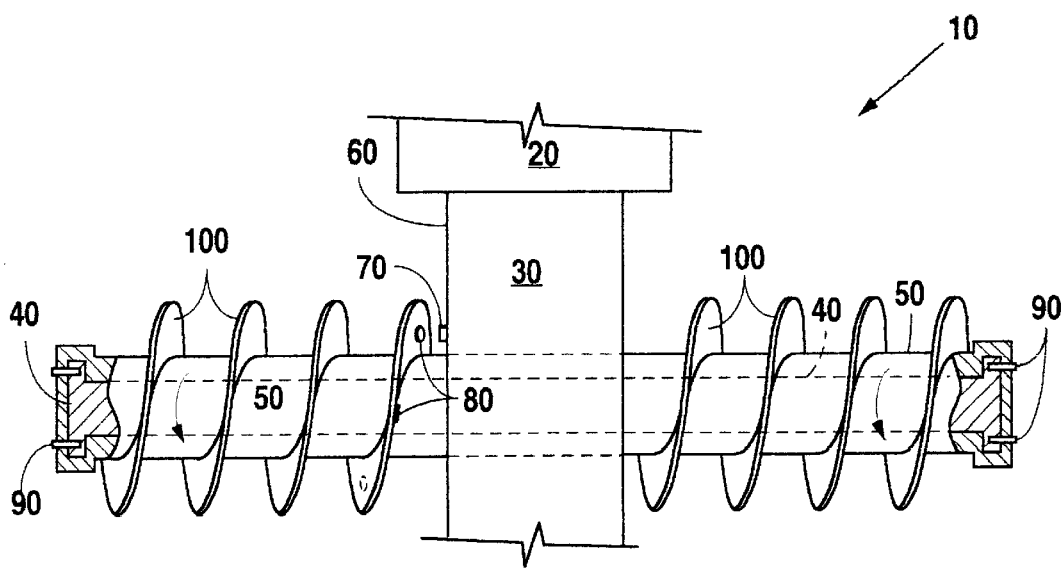
FIG. 3 is a perspective view of the broken shear pin indicator system of the present invention.

In the present invention, the operator of the cab is notified of the broken shear pin when the broken shear pin indicator is activated. FIG. 3 is a perspective view of the broken shear pin indicator system of the present invention. As shown in FIG. 3, power to the snow blower head cutter drums comes from the power train 10. Power passes from the motor 20, to the transmission 30, to the drive shaft 40. The drive shaft 40 extends from either side of the drive box 60. The snow blower head cutter drums 50 encircle the drive shaft 40 and are attached thereto by the shear pins 90. These shear pins 90 are used to transmit power from the rotating inner drive shaft 40 to the snow blower head cutter drums 50.

Continuing in FIG. 3, the proximity sensors 70 are located on either side of the drive box 60 and are positioned such that they focus on the designated targets 80 which are located on a cutter ribbon 100 on the snow blower head cutter drum 50. Such designated targets 80 may be grease fittings or small welds which provide a signal each time they pass the stationary proximity sensor 70. In one embodiment of the present invention, the targets 80 are one inch diameter pipes welded to the cutter drum 50.

Figure 4:
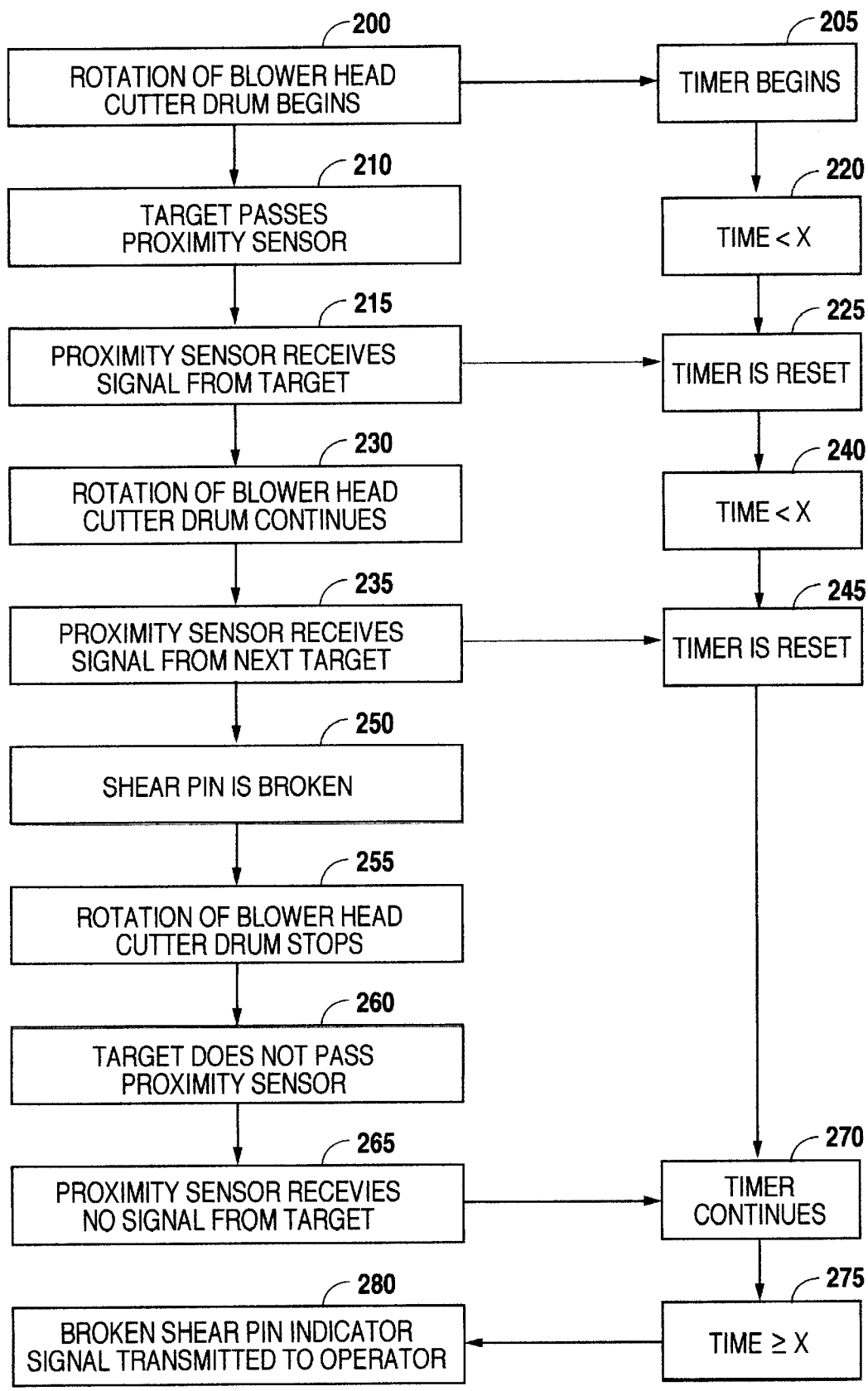
FIG. 4 is a flow chart illustrating the operation of the broken shear pin indicator system of the present invention.

FIG. 4 is a flow chart illustrating the operation of the broken shear pin indicator system of the present invention. As the rotation of the blower head cutter drum 50 begins in step 200, the timer begins in step 205. As the cutter drum 50 continues to rotate, the target 80 passes the proximity sensor 70 in step 210. The proximity sensor 70 receives the signal from the target 80 in step 215, at which point the timer has reached a predetermined time less than x in step 220 and is reset in step 225. The rotation of the blower head cutter drum 50 continues in step 230. The proximity sensor 70 receives the signal from the next target 80 in step 235b, at which point the timer has reached a time less than x in step 240 and is reset in step 245.

The shear pin 90 is broken in step 250 and the rotation of the blower head cutter drum 50 stops in step 255. The target 80 does not pass the proximity sensor 70 in step 260 and the proximity sensor 70 receives no signal from the target 80 in step 265. The timer continues running in step 270 and the time equals or exceeds the predetermined time x in step 275. When this occurs, the broken shear pin indicator signal is transmitted to the operator in the cab in step 280. With this indication, the operator will know that one of the cutter drums 50 is not rotating and the snow clearing operation must be stopped to arrange for replacement of the broken shear pin 90.

Although the invention has been described with reference to the preferred embodiment, this description is not meant to be construed in a limited sense. Various modifications of the preferred embodiment, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A broken shear pin indicator system for use in a rotary snow blower vehicle comprising:
    a broken shear pin indicator;
    a drive box;
    a drive shaft with a first end and a second end, rotatably connected to said drive box at said first end;
    a blower head cutter drum with a first end and a second end, rotatably connected to said drive box and constructed to encircle said drive shaft;
    at least one shear pin attached to said second end of said drive shaft and said second end of said blower head cutter drum;
    at least one target attached to said first end of said blower head cutter drum;
    at least one proximity sensor attached to said drive box, positioned to focus on said at least one target and to detect signals issued therefrom; and
    at least one timer in electrical communication with the broken shear pin indicator and constructed to measure the length of time between signals received by the proximity sensor;
    wherein said timer transmits an electrical impulse to said broken shear pin indicator when said time between the signals received by said proximity sensor equals or exceeds a predetermined length of time.

2. The broken shear pin indicator system as defined in claim 1 wherein said at least one target is a pipe welded to the snow blower head cutter drum.

3. The broken shear pin indicator system as defined in claim 1 wherein said at least one target is a grease fitting on the snow blower head cutter drum.

4. The broken shear pin indicator system as defined in claim 1 wherein said electrical impulse causes said broken shear pin indicator to illuminate.

5. The broken shear pin indicator system as defined in claim 1 wherein said electrical impulse causes said broken shear pin indicator to emit a sound.

6. A method for indicating a broken shear pin for use in a rotary snow blower vehicle, wherein said vehicle includes a drive shaft and a snowblower head cutter drum, constructed and arranged to encircle said drive shaft, said method comprising the steps of:
    connecting at least one shear pin to said drive shaft and said snow blower head cutter drum;
    mounting a target on said snow blower head cutter drum;
    mounting a proximity sensor on said vehicle to focus on said target;
    detecting a signal from said target by said proximity sensor;
    measuring the length of time between the signals from the target;
    restarting the time measurement every time the target signals the proximity sensor; and
    sending an electrical impulse to said broken shear pin indicator system when the length of time between signals equals or exceeds a predetermined amount of time.

7. A method for indicating a broken shear pin as defined in claim 6, wherein said electrical impulse to said broken shear pin indicator system further includes the step of illuminating the indicator.

8. A method for indicating a broken shear pin as defined in claim 6, wherein said electrical impulse to said broken shear pin indicator system further includes the step of causing the indicator to emit a sound.

9. A method for indicating a broken shear pin, said method comprising the steps of:
    measuring the rotational time between target points on a snow blower head cutter drum; and
    triggering a broken shear pin indicator when said rotational time equals or exceeds a predetermined amount.

10. The method of claim 9, further comprising the step of:
    utilizing a proximity sensor to detect the rotation of said target points on a snow blower head cutter drum.

11. The method of claim 9, wherein said broken shear pin indicator illuminates.

12. The method of claim 9, wherein said broken shear pin indicator emits a sound.

13. A system for indicating a broken shear pin, said system comprising:
- a vehicle;
- a broken shear pin indicator system attached to said vehicle, said broken shear pin indicator system including:
  - a broken shear pin indicator;
  - a drive box;
  - a drive shaft;
  - a snow blower head cutter drum;
  - a least one shear pin; and
  - at least one target, proximity sensor, and timer, constructed and arranged to monitor and detect the absence of rotation of the snow blower head cutter drum.

14. The system as defined in claim 13, wherein said at least one target is a pipe welded to the snow blower head cutter drum.

15. The system as defined in claim 13, wherein said at least one target is a grease fitting on the snow blower head cutter drum.

16. The system as defined in claim 13, wherein said broken shear pin indicator illuminates.

17. The system as defined in claim 13, wherein said broken shear pin indicator emits a sound.

* * * * *